US011616374B2

(12) United States Patent
Ono et al.

(10) Patent No.: US 11,616,374 B2
(45) Date of Patent: *Mar. 28, 2023

(54) BATTERY CONTROL UNIT AND BATTERY SYSTEM

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 17/035,715

(22) Filed: Sep. 29, 2020

(65) Prior Publication Data
US 2021/0098996 A1    Apr. 1, 2021

(30) Foreign Application Priority Data
Sep. 30, 2019  (JP) .............................. JP2019-179431

(51) Int. Cl.
*H02J 7/00*    (2006.01)
*H01M 50/51*   (2021.01)
*H01M 50/514*  (2021.01)

(52) U.S. Cl.
CPC .......... *H02J 7/0013* (2013.01); *H02J 7/0016* (2013.01); *H02J 7/0048* (2020.01); *H02J 7/007182* (2020.01); *H01M 50/51* (2021.01); *H01M 50/514* (2021.01)

(58) Field of Classification Search
CPC .............. H02J 7/005; H02J 7/007182

USPC ......................................... 320/122
See application file for complete search history.

(56) References Cited

U.S. PATENT DOCUMENTS

| | | | | |
|---|---|---|---|---|
| 5,666,040 A | * | 9/1997 | Bourbeau | H01M 10/48 320/147 |
| 5,747,968 A | * | 5/1998 | Merritt | H02J 7/0018 320/DIG. 29 |
| 5,889,385 A | * | 3/1999 | Podrazhansky | H02J 7/0016 320/160 |
| 5,952,815 A | * | 9/1999 | Rouillard | H02J 7/0048 320/122 |
| 7,557,538 B2 | * | 7/2009 | Yau | H02J 7/0016 320/122 |
| 8,179,139 B2 | * | 5/2012 | Kawasumi | H01M 50/572 324/426 |

(Continued)

FOREIGN PATENT DOCUMENTS

| | | |
|---|---|---|
| JP | 2013-31249 A | 2/2013 |
| WO | 2013/008408 A1 | 1/2013 |

*Primary Examiner* — John Trischler
(74) *Attorney, Agent, or Firm* — Kenealy Vaidya LLP

(57) ABSTRACT

A battery control unit includes a plurality of battery units, a charger configured to charge a battery, a controller, and a charging controller. Each of the plurality of battery units includes a switching unit. The switching unit is configured to switch between a connected state where the battery configured to be located in the same battery unit as that of the switching unit is connected in series with the battery configured to be located in an adjacent battery unit, and a non-connected state where the battery in the same battery unit as that of the switching unit is disconnected from the series connection with the battery in the adjacent battery unit.

3 Claims, 4 Drawing Sheets

(56) References Cited

U.S. PATENT DOCUMENTS

| | | | | |
|---|---|---|---|---|
| 8,470,464 B2* | 6/2013 | Troutman | H01M 10/482 | 429/150 |
| 9,112,370 B2* | 8/2015 | Yen | H02J 7/0016 | |
| 9,216,658 B2* | 12/2015 | Sekizaki | B60L 50/64 | |
| 9,444,267 B2* | 9/2016 | Suzuki | H02J 7/00 | |
| 9,520,613 B2* | 12/2016 | Brockerhoff | B60L 58/19 | |
| 10,250,045 B2* | 4/2019 | Sherstyuk | H02J 7/0071 | |
| 10,300,806 B2* | 5/2019 | Paik | B60L 58/16 | |
| 10,720,781 B2* | 7/2020 | Taylor, Jr. | H01M 50/20 | |
| 10,756,548 B2* | 8/2020 | Syouda | H02J 7/0024 | |
| 10,879,707 B2* | 12/2020 | Taylor, Jr. | H02J 7/0014 | |
| 10,923,923 B2* | 2/2021 | Sherstyuk | H02J 7/0047 | |
| 11,081,899 B2* | 8/2021 | Ono | H02J 7/0013 | |
| 11,128,153 B1* | 9/2021 | Cho | H02J 7/007184 | |
| 11,277,012 B2* | 3/2022 | Ono | H02J 7/0019 | |
| 2005/0083016 A1* | 4/2005 | Yau | H02J 7/0016 | 320/116 |
| 2006/0255769 A1* | 11/2006 | Liu | H01M 10/441 | 320/134 |
| 2008/0129225 A1* | 6/2008 | Yamamoto | H05B 45/38 | 315/307 |
| 2009/0066291 A1* | 3/2009 | Tien | H02J 7/0016 | 320/118 |
| 2009/0251100 A1* | 10/2009 | Incledon | H02J 7/0016 | 320/137 |
| 2010/0237829 A1* | 9/2010 | Tatebayashi | H01M 10/425 | 320/118 |
| 2010/0253284 A1* | 10/2010 | Aoki | H01M 10/441 | 320/136 |
| 2011/0313613 A1* | 12/2011 | Kawahara | B60L 3/04 | 320/134 |
| 2012/0094150 A1* | 4/2012 | Troutman | H01M 50/51 | 429/61 |
| 2012/0280695 A1* | 11/2012 | Sekizaki | H01M 10/48 | 324/434 |
| 2012/0306448 A1* | 12/2012 | Lu | H02J 7/0016 | 320/118 |
| 2013/0035813 A1* | 2/2013 | Kusumi | B60W 10/26 | 701/22 |
| 2013/0151183 A1* | 6/2013 | Nam | G01R 31/392 | 702/63 |
| 2013/0187608 A1* | 7/2013 | Yen | H02J 7/0016 | 320/118 |
| 2013/0187611 A1* | 7/2013 | Suzuki | H01M 10/441 | 320/118 |
| 2014/0021923 A1* | 1/2014 | Uchida | H02J 7/0016 | 320/118 |
| 2014/0117975 A1* | 5/2014 | Shimomura | H03K 17/005 | 327/408 |
| 2015/0028817 A1* | 1/2015 | Brockerhoff | H01M 10/441 | 429/61 |
| 2017/0117721 A1* | 4/2017 | Toya | H02J 7/0013 | |
| 2017/0179760 A1* | 6/2017 | Jawany | B60R 16/03 | |
| 2018/0062402 A1* | 3/2018 | Syouda | H02J 7/0019 | |
| 2018/0191176 A1* | 7/2018 | Sherstyuk | H02J 7/00712 | |
| 2019/0115631 A1* | 4/2019 | Taylor, Jr. | H02J 7/00306 | |
| 2019/0115767 A1* | 4/2019 | Taylor, Jr. | H01M 10/425 | |
| 2019/0115768 A1* | 4/2019 | Taylor, Jr. | H01M 10/482 | |
| 2019/0222037 A1* | 7/2019 | Sherstyuk | H02J 7/0047 | |
| 2020/0028375 A1* | 1/2020 | Ono | H01M 10/441 | |
| 2020/0274368 A1* | 8/2020 | Crouse, Jr. | H02J 7/0021 | |
| 2020/0321788 A1* | 10/2020 | Ono | H02J 7/0019 | |
| 2020/0321789 A1* | 10/2020 | Ono | H02J 7/00712 | |
| 2021/0075230 A1* | 3/2021 | Ono | H02J 7/005 | |
| 2021/0234380 A1* | 7/2021 | Ono | H02J 7/0013 | |
| 2021/0273461 A1* | 9/2021 | Lin | H02J 7/0016 | |
| 2021/0296912 A1* | 9/2021 | Cho | H02J 7/0024 | |
| 2021/0399557 A1* | 12/2021 | Ono | H02J 7/04 | |
| 2021/0399558 A1* | 12/2021 | Ono | H02J 7/0024 | |
| 2022/0045524 A1* | 2/2022 | Syouda | H02J 7/0024 | |
| 2022/0060029 A1* | 2/2022 | Syouda | H02J 7/00712 | |
| 2022/0060030 A1* | 2/2022 | Ono | G01R 31/3828 | |
| 2022/0077694 A1* | 3/2022 | Ono | H02J 7/0024 | |

* cited by examiner

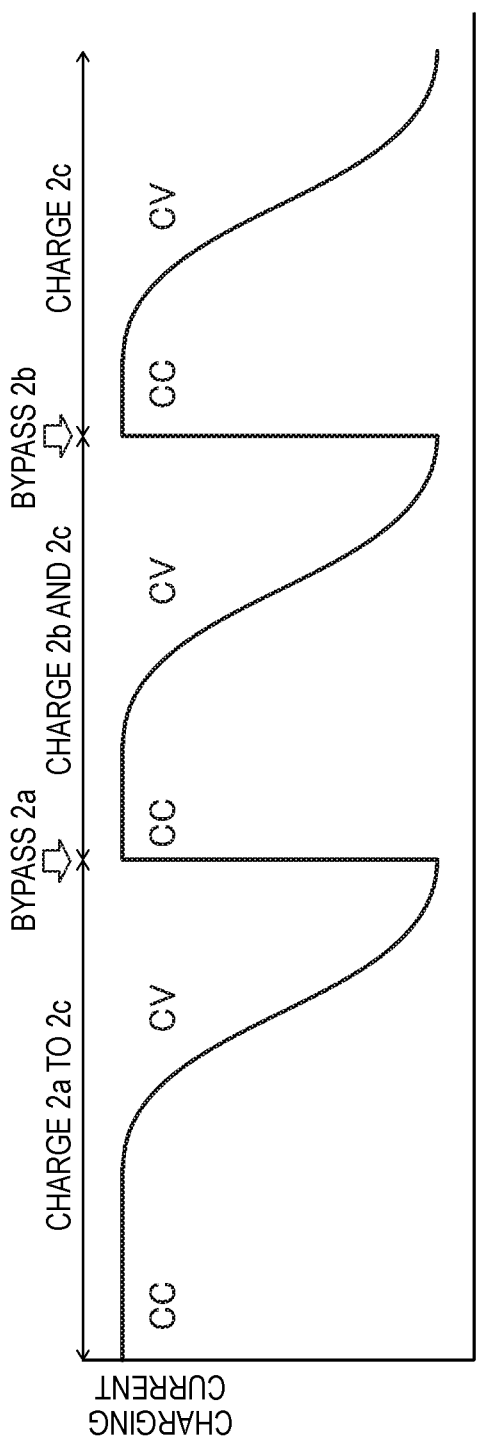
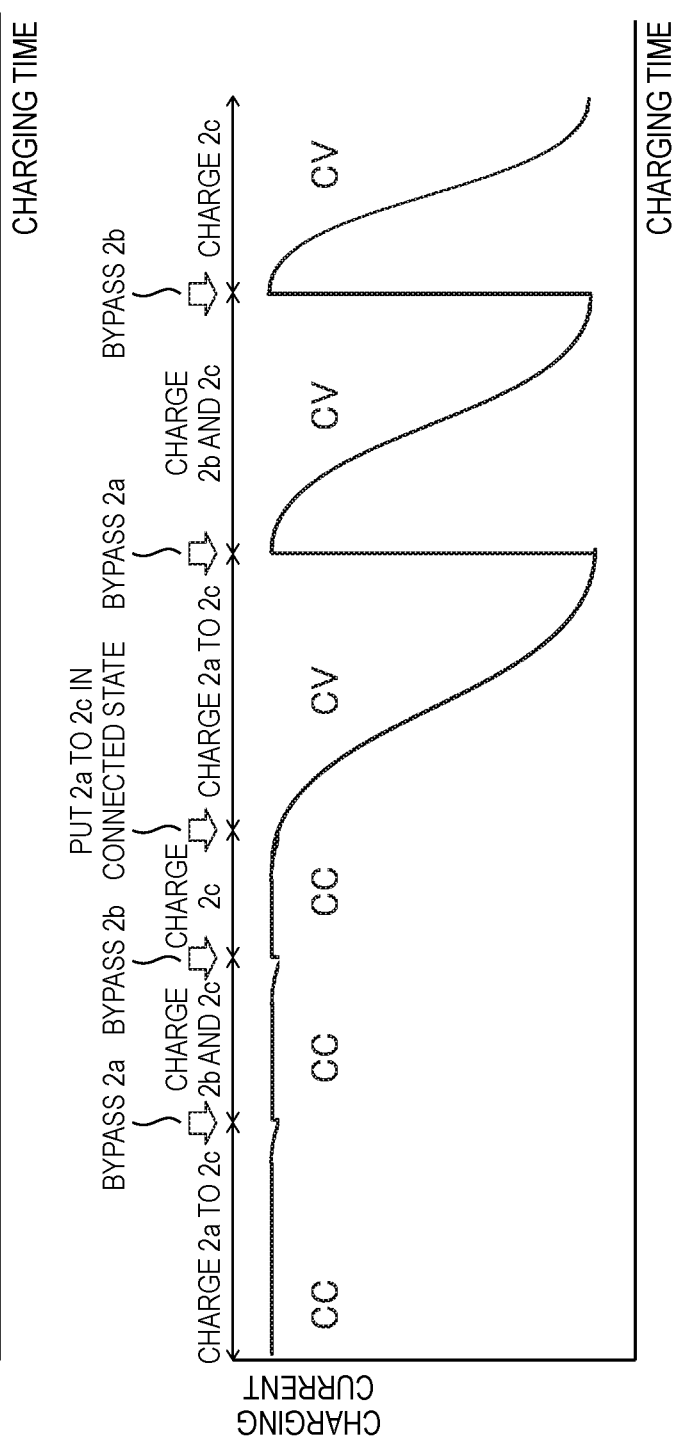
RELATED ART
FIG. 2A
FIG. 2B

RELATED ART

BATTERY CONTROL UNIT AND BATTERY SYSTEM

CROSS REFERENCE TO RELATED APPLICATIONS

This application claims priority from Japanese Patent Application No. 2019-179431 filed on Sep. 30, 2019, the entire contents of which are incorporated herein by reference.

BACKGROUND OF THE INVENTION

Field of the Invention

The present invention relates to a battery control unit and a battery system.

Description of Related Art

There is a battery system configured by connecting a plurality of batteries in series. Deterioration of the plurality of batteries varies due to, for example, a variation in manufacturing or a variation in an operation environment. For example, a battery close to a heat source deteriorates rapidly, while a battery away from the heat source deteriorates slowly.

Therefore, a battery that has deteriorated during charging and discharging reaches a charge termination voltage first. In this case, even when there is remaining capacity in other batteries, charging must be stopped and a battery capacity cannot be used up. Therefore, a system has been proposed in which a battery that has reached the charge termination voltage is bypassed and disconnected from charging, and charging of a battery that has not reached the charge termination voltage is continued (Patent Literature 1: JP-A-2013-31249).

In general, a battery is often CCCV charged in order to prevent overcharging. The CCCV charging is charging that combines constant current charging (CC: constant current) and constant voltage charging (CV: constant voltage). In the CCCV charging, the constant current charging is performed until the battery reaches a charge changing voltage, and when the charge changing voltage is reached, switching to the constant voltage charging is performed so as to reduce a charging current.

[Patent Literature 1] JP-A-2013-31249

For example, when three batteries B1 to B3 are CCCV charged, it is assumed that the three batteries B1 to B3 are charged as follows. When the battery B1 reaches the charge termination voltage, only the battery 131 is bypassed, and the batteries B2 and B3 are CCCV charged. Thereafter, when the battery B2 reaches the charge termination voltage, the battery B2 is also bypassed, and finally only the battery B3 is CCCV charged. However, in such a charging method, when the battery B1 has to switch from the constant current charging to the constant voltage charging so as to reduce the charging current, the batteries B2 and B3 are in a state where the charging current does not have to be reduced yet, but the charging current has to be reduced and charged in accordance with the battery B1. Therefore, there is a problem that a charging time becomes long.

SUMMARY

One or more embodiments provide a battery control unit and a battery system that can shorten a charging time.

In an aspect (1), a battery control unit includes a plurality of battery units, a charger configured to charge a battery, a controller, and a charging controller. Each of the plurality of battery units includes a switching unit. The switching unit is configured to switch between a connected state where the battery configured to be located in the same battery unit as that of the switching unit is connected in series with the battery configured to be located in an adjacent battery unit, and a non-connected state where the battery in the same battery unit as that of the switching unit is disconnected from the series connection with the battery in the adjacent battery unit. The controller is configured to determine whether the battery configured to be located in each of the plurality of battery units has reached a charge termination voltage during charging, and control the switching unit in the same battery unit as that of the battery determined to have reached the charge termination voltage to be in the non-connected state. The charging controller is configured to charge the battery in each of the plurality of battery units with a constant current, determine whether the battery has reached a charge changing voltage during the constant current charging, control the switching unit in the same battery unit as that of the battery determined to have reached the charge changing voltage to be in the non-connected state, control the batteries in all of the plurality of battery units to be in the connected state when the batteries in all of the plurality of battery units have reached the charge changing voltage, and change the batteries from a constant current charging mode to a constant voltage charging mode so as to charge the batteries at a constant voltage.

BRIEF DESCRIPTION OF THE DRAWINGS

FIG. 2A is an illustrative diagram for illustrating an operation of the battery system of a related art. FIG. 2B is an illustrative diagram for illustrating an operation of the battery system shown in FIG. 1.

DETAILED DESCRIPTION

A specific embodiment according to the present invention will be described below with reference to the drawings.

Figure 1:
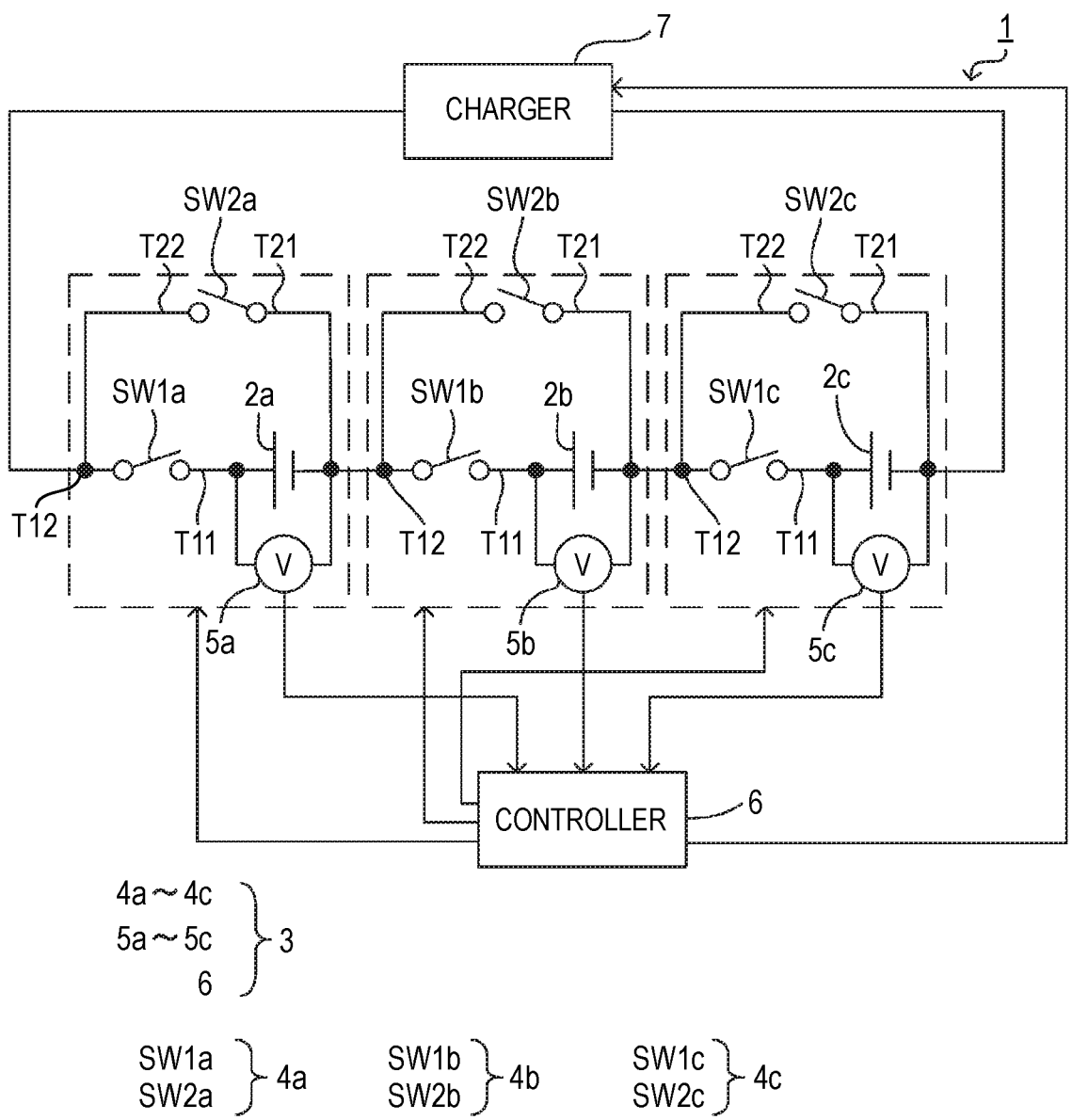
FIG. 1 is a circuit diagram showing a battery system.

A battery system shown in FIG. 1 is, for example, an apparatus that supplies power obtained by reusing a deteriorated battery.

As shown in FIG. 1, a battery system 1 includes a plurality of batteries 2a to 2c and a battery control unit 3. In the present embodiment, an example in which three batteries 2a to 2c are connected in series is described to simplify the description, but the present invention is not limited thereto. The number of the batteries 2a to 2c may be plural, and may be two or four or more. Each of the plurality of batteries 2a to 2c is a chargeable and dischargeable storage battery, and may be configured with one cell or may be configured with a plurality of cells.

The battery control unit 3 includes a plurality of switching units 4a to 4c, a plurality of voltage measurement units 5a to 5c, a controller 6, and a charger 7. The plurality of switching units 4a to 4c are provided corresponding to the plurality of batteries 2a to 2c, respectively. The plurality of switching units 4a to 4c have the same configuration.

The switching units 4a to 4c are provided so as to be switchable between a connected state where corresponding batteries 2a to 2c are connected in series with other batteries 2a to 2c and a non-connected state where the corresponding batteries 2a to 2c are disconnected from series connection with other batteries 2a to 2c. Specifically, the batteries 2a to 2c, switched to a connected state by the switching units 4a to 4c, are connected in series and used as a power source. On the other hand, the batteries 2a to 2c, switched to a non-connected state by the switching units 4a to 4c, are disconnected from the batteries 2a to 2c in a connected state and are not used as the power source.

The switching unit 4a is configured with a first switch SW1a connected in series with the battery 2a, and a second switch SW2a connected in parallel to the battery 2a and the first switch SW1a. One end T11 of the first switch SW1a is connected to one electrode (for example, a positive electrode) of the battery 2a. One end T21 of the second switch SW2a is connected to the other electrode (for example, a negative electrode) of the battery 2a, and the other end T22 of the second switch SW2a is connected to the other end T12 of the first switch SW1a. The switching units 4b and 4c can be described by replacing "a" in the above description of the switching unit 4a with "b" and "c" respectively, and detailed description thereof will be omitted.

The other end T12 of a first switch SW1b is connected to a negative electrode of the battery 2a, and the other end T12 of a first switch SW1c is connected to a negative electrode of the battery 2b. That is, the first switch SW1b is connected between the battery 2a and the battery 2b that are adjacent to each other, and the first switch SW1c is connected between the battery 2b and the battery 2c that are adjacent to each other, respectively.

According to the above configuration, when the second switches SW2a to SW2c are turned off and the first switches SW1a to SW1c are turned on, the corresponding batteries 2a to 2c are in a connected state. Further, when the first switches SW1a to SW1c is are turned off the corresponding batteries 2a to 2c are in a non-connected state. At this time, when the second switches SW2a to SW2c are turned on, a bypass path is formed, and only the connected batteries 2a to 2c are connected in series.

The plurality of voltage measurement units 5a to 5c measure both-end voltages of the corresponding batteries 2a to 2c, and output measurement results thereof to the controller 6 to be described later.

The controller 6 is configured with well-known CPU, ROM, and RAM, and controls the entire battery system 1. The controller 6 controls on/off of the first switches SW1a to SW1c and the second switches SW2a to SW2c based on the both-end voltages of the batteries 2a to 2c.

The charger 7 is connected to both ends of the batteries 2a to 2c and charges the batteries 2a to 2c. The charger 7 can be switched between the constant current charging and the constant voltage charging. The controller 6 controls the charger 7 to change between the constant current charging and the constant voltage charging.

Figure 3A:
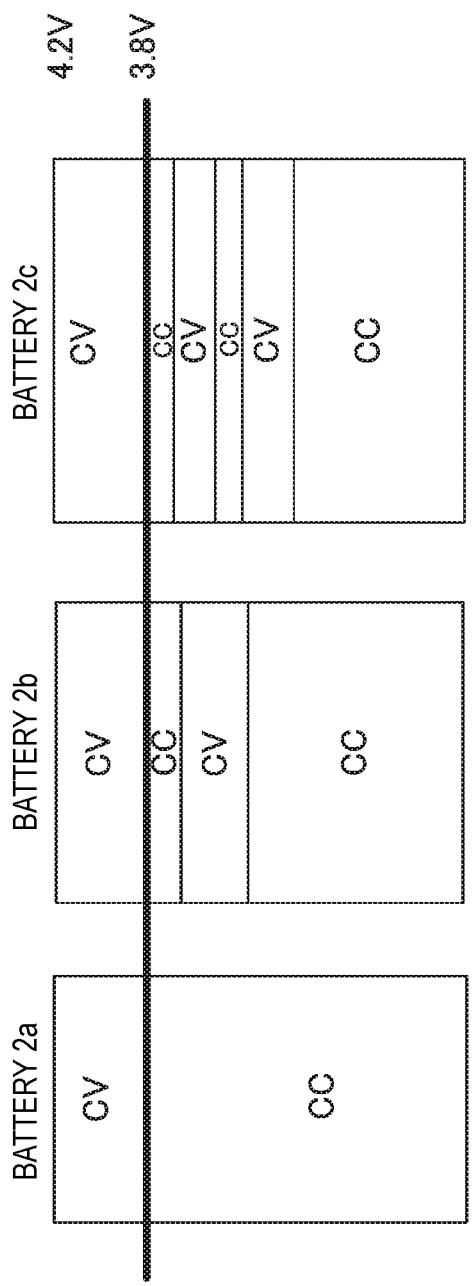
FIG. 3A is a time chart of the battery system of a related art.

Next, an outline of an operation of the battery system 1 described above will be described below with reference to FIGS. 24 and 2B, and FIGS. 3A and 3B. It is assumed that a capacity decreases in an order of battery 2c>battery 2b>battery 2a due to deterioration. Further, for example, the description will be made assuming that a discharge termination voltage=4.2 V and a charge changing voltage for changing from the constant current charging to the constant voltage charging=3.8 V (<discharge termination voltage). In the related art, as shown in FIG. 2A and FIG. 3A, first, the controller 6 switches the charger 7 to the constant current charging (CC) and charges the batteries 2a to 2c with a constant current. Thereafter, when the battery 2a first reaches 3.8 V, the controller 6 switches the charger 7 to the constant voltage charging (CV) and charges the batteries 2a to 2c at a constant voltage. When the battery 2a reaches 4.2 V, the controller 6 bypasses the battery 2a by putting the battery 2a in a non-connected state and changes the charger 7 to the constant current charging. Accordingly, the batteries 2b and 2c are charged with a constant current. When the battery 2b reaches 3.8 V, the controller 6 switches the charger 7 to the constant voltage charging and charges the batteries 2b and 2c at a constant voltage. When the battery 2b reaches 4.2 V, the controller 6 bypasses the battery 2b and switches the charger 7 to the constant current charging. Accordingly, the battery 2c is charged with a constant current. When the battery 2c reaches 3.8 V, the controller 6 switches the charger 7 to the constant voltage charging and charges the battery 2c at a constant voltage. When the battery 2c reaches 4.2 V, charging is terminated.

Figure 3B:
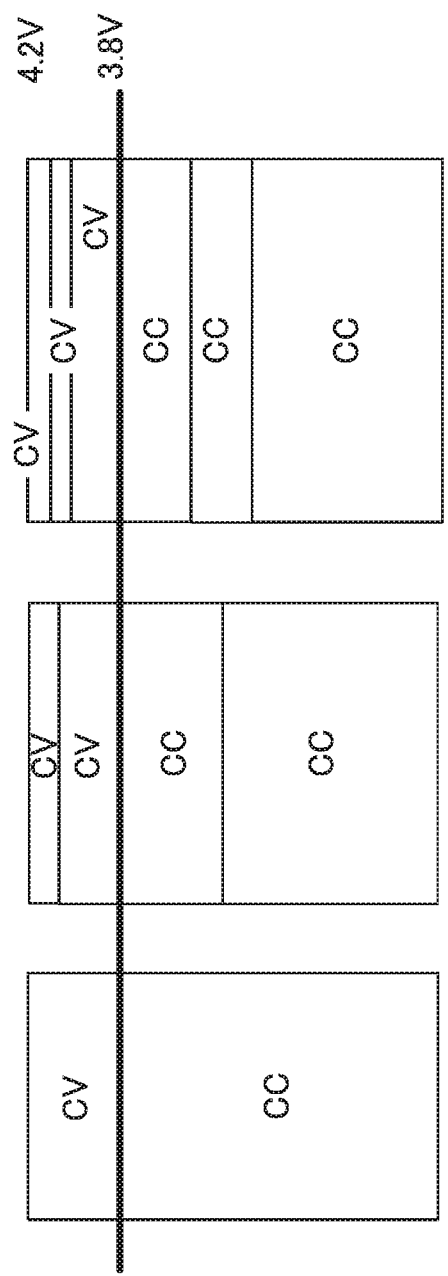
FIG. 3B is a time chart of the battery system shown in FIG. 1.

On the contrary, in the present embodiment, as shown in FIGS. 2B and 3B, the controller 6 functions as a charging controller and switches the charger 7 to the constant current charging (CC). The batteries 2a to 2c are charged with a constant current. Thereafter, when the battery 2a first reaches 3.8 V, the controller 6 bypasses the battery 2a and continues the constant current charging of the batteries 2b and 2c. When the battery 2b reaches 3.8 V, the controller 6 bypasses the battery 2b and continues the constant current charging of the battery 2c. When the battery 2c reaches 3.8 V, the controller 6 returns all the batteries 2a to 2c to a connected state and changes the charger 7 to the constant voltage charging. Accordingly, the batteries 2a to 2c are charged at a constant voltage. Thereafter, the controller 6 bypasses the batteries 2a to 2c when the batteries 2a to 2c reaches 4.2 V.

As is clear from FIGS. 2A and 2B, in the related art, although the batteries 2b and 2c have not reached 3.8 V, the constant voltage charging in which a charging current is reduced is performed. On the other hand, in the present embodiment, if all the batteries 2a to 2c have not reached 3.8 V, the constant voltage charging is not performed, and a charging time can be shortened.

Figure 4:
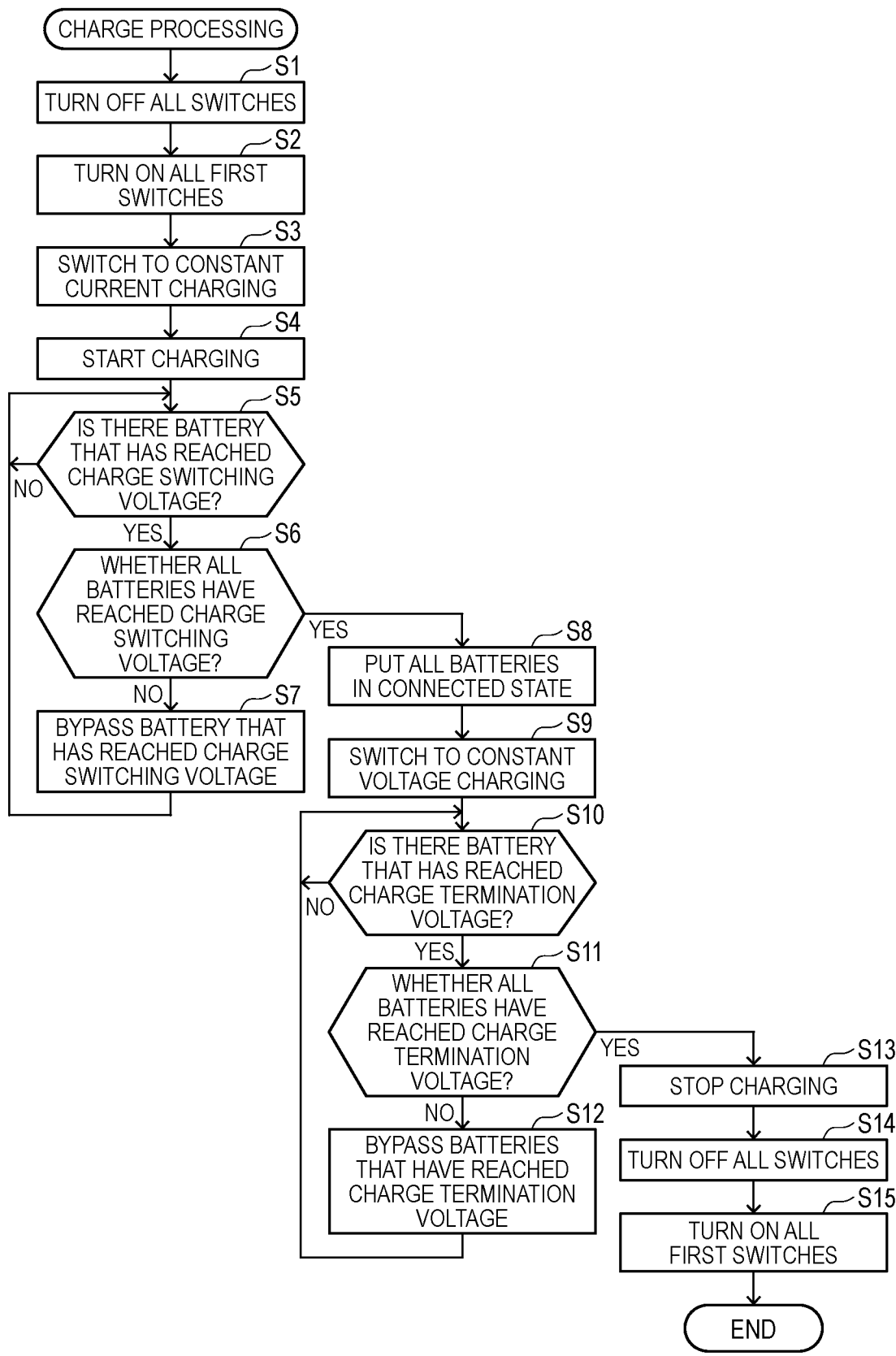
FIG. 4 is a flow chart showing a charge processing procedure of a controller that constitutes the battery system shown in FIG. 1.

Next, the detailed operation of the battery system 1 described above will be described below with reference to FIG. 4. FIG. 4 is a flowchart showing a charge processing procedure of the controller 6 shown in FIG. 1.

Upon receiving a charging command, the controller 6 starts the charge processing shown in FIG. 4. First, the controller 6 turns off all the first switches SW1a to SW1c and all the second switches SW2a to SW2c (step S1). Thereafter, the controller 6 turns on all the first switches SW1a to SW1c (step S2) so as to connect all the batteries 2a to 2c in series. Next, after switching the charger 7 to the constant current charging (step S3), the controller 6 connects the charger 7 to the batteries 2a to 2c and starts the constant current charging (step S4).

Next, the controller 6 acquires the both-end voltages of the batteries 2a to 2c measured by the voltage measurement units 5a to 5c, and compares the acquired both-end voltages with the charge changing voltage (3.8 V) (step S5). As a result of the comparison, the controller 6 returns to step S5 if there is no battery 2a to 2c that has reached the charge changing voltage among the connected batteries 2a to 2c (N in step S5).

On the contrary, as a result of the comparison, if there is a battery among the batteries 2a to 2c that has reached the charge changing voltage (V in step S5), the controller 6 determines whether all the batteries 2a to 2c have reached the charge changing voltage (step S6). If all the batteries 2a to 2c have not reached the charge changing voltage (N in step S6), the controller 6 bypasses the batteries 2a to 2c determined to have reached the charge changing voltage in step S6 (step S7), and then returns to step S5.

If all the batteries 2a to 2c have reached a charge changing voltage (Y in step S6), the controller 6 puts all the batteries 2a to 2c in a connected state (step S8) and switches the charger 7 to the constant voltage charging (step S9).

Next, the controller 6 acquires the both-end voltages of the batteries 2a to 2c measured by the voltage measurement units 5a to 5c, and compares the acquired both-end voltages with the charge termination voltage (4.2 V) (step S10). As a result of the comparison, the controller 6 returns to step S10 if there is no battery 2a to 2c that has reached the charge termination voltage among the connected batteries 2a to 2c (N in step S10).

On the contrary, as a result of the comparison, if there is a battery among the batteries 2a to 2c that has reached the charge termination voltage (Y in step S10), the controller 6 determines whether all the batteries 2a to 2c have reached the charge termination voltage (step S11). If all the batteries 2a to 2c have not reached the charge termination voltage (N in step S11), the controller 6 bypasses the batteries 2a to 2c determined to have reached the charge termination voltage in step S10 (step S12), and then returns to step S10.

On the other hand, when determining that all the batteries 2a to 2c have reached the discharge termination voltage (Y in step S11), the controller 6 disconnects the charger 7 from the batteries 2a to 2c so as to stop charging (step S13). Thereafter, the controller 6 turns off all the first switches SW1a to SW1c and all the second switches SW2a to SW2c (step S14), and then turns on all the first switches SW1a to SW1c (step S15) so as to terminate the processing.

The present invention is not limited to the embodiment described above, and modifications, improvements, or the like can be made as appropriate. In addition, the material, shape, dimension, number, arrangement position, and the like of each component in the above-described embodiment are optional and are not limited as long as the present invention can be achieved.

According to the embodiment described above, although the switching unit 4a is configured with the first switch SW1a and the second switch SW2a, the switching unit 4b is configured with the first switch SW1b and the second switch SW2b, and the switching unit 4c is configured with the first switch SW1c and the second switch SW2c, the present invention is not limited thereto. The switching units 4a to 4c may be configured with switching switches that select one of the batteries 2a to 2c and a bypass circuit connected in parallel to the batteries 2a to 2c.

Here, characteristics of the embodiment of the battery control unit and the battery system according to the present invention described above will be briefly summarized in the following [1] to [3].

[1] A battery control unit (3) comprising:
a plurality of battery units;
a charger (7) configured to charge a battery (2a to 2c);
a controller (6); and
a charging controller (6),
wherein each of the plurality of battery units includes a switching unit (4a to 4c),
wherein the switching unit (4a to 4c) is configured to switch between a connected state where the battery (2a to 2c) configured to be located in the same battery unit as that of the switching unit (4a to 4c) is connected in series with the battery (2a to 2c) configured to be located in an adjacent battery unit, and a non-connected state Where the battery (2a to 2c) in the same battery unit as that of the switching unit (4a to 4c) is disconnected from the series connection with the battery (2a to 2c) in the adjacent battery unit,
wherein the controller (6) is configured to determine whether the battery (2a to 2c) configured to be located in each of the plurality of battery units has reached a charge termination voltage during charging, and control the switching unit (4a to 4c) in the same battery unit as that of the battery (2a to 2c) determined to have reached the charge termination voltage to be in the non-connected state, and
wherein the charging controller (6) is configured to charge the battery (2a to 2c) in each of the plurality of battery units with a constant current, determine whether the battery (2a to 2c) has reached a charge changing voltage during the constant current charging, control the switching unit (4a to 4c) in the same battery unit as that of the battery (2a to 2c) determined to have reached the charge changing voltage to be in the non-connected state, control the batteries (2a to 2c) in all of the plurality of battery units to be in the connected state when the batteries (2a to 2c) in all of the plurality of battery units have reached the charge changing voltage, and change the batteries (2a to 2c) from a constant current charging mode to a constant voltage charging mode so as to charge the batteries (2a to 2c) at a constant voltage.

[2] The battery control unit (3) according to [1],
wherein the switching unit (4a to 4c) includes a first switch (SW1a to 1c) and a second switch (SW2a to 2c),
wherein the first switch (SW1a to 1c) is configured to be connected in series with the battery (2a to 2c) configured to be located in the same battery unit, and
wherein the second switch (SW2a to 2c) is configured to be connected in parallel to the battery (2a to 2c) and the first switch (SW2a to 2c) configured to be located in the same battery unit.

[3] A battery system (1) comprising:
a plurality of batteries (2a to 2c) connected in series; and
the battery control unit (3) according to the above described [1].

According to the aspect [1], the charging controller charges the battery with the constant current, determines whether the battery has reached the charge changing voltage during the constant current charging, controls the switching unit corresponding to the battery determined to have reached the charge changing voltage to be in the non-connected state, and controls all the batteries to be in the connected state and changes all the batteries to the constant voltage charging so as to cause the batteries to be charged at the constant voltage when all the batteries have reached the charge changing voltage. Accordingly, it is possible to charge all the batteries with the constant current before the charge changing voltage is reached, and switch all the batteries to the constant voltage charging when the charge changing voltage is reached. Therefore, a charging time of the plurality of batteries can be shortened.

According to one or more embodiments, it is possible to provide the battery control unit and the battery system that can shorten the charging time of the plurality of batteries.

What is claimed is:

1. A battery control unit comprising:
a plurality of battery units;
a charger configured to charge a battery;

a processor; and a charging controller, wherein each of the plurality of battery units includes a switching unit, wherein the switching unit is configured to switch between a connected state where the battery configured to be located in the same battery unit as that of the switching unit is connected in series with the battery configured to be located in an adjacent battery unit, and a non-connected state where the battery in the same battery unit as that of the switching unit is disconnected from the series connection with the battery in the adjacent battery unit, wherein the processor is configured to charge the battery in each of the plurality of battery units with a constant current, determine whether the battery has reached a charge changing voltage during the constant current charging, control the switching unit in the same battery unit as that of the battery determined to have reached the charge changing voltage to be in the non-connected state, control the batteries in all of the plurality of battery units to be in the connected state when the batteries in all of the plurality of battery units have reached the charge changing voltage, and change the batteries from a constant current charging mode to a constant voltage charging mode so as to charge the batteries at a constant voltage, wherein the processor is configured to determine whether the battery configured to be located in each of the plurality of battery units has reached the charge termination voltage during the constant voltage charging, and control the switching unit in the same battery unit as that if the battery determined to have reached the charge termination voltage to in the non-contact state, and wherein the charge termination voltage is different from the charge changing voltage.

2. The battery control unit according to claim 1, wherein the switching unit includes a first switch and a second switch, wherein the first switch is configured to be connected in series with the battery configured to be located in the same battery unit, and wherein the second switch is configured to be connected in parallel to the battery and the first switch configured to be located in the same battery unit.

3. A battery system comprising:

a plurality of batteries connected in series; and the battery control unit according to claim 1.

* * * * *